3,737,424
PHENYL-AZO-NAPHTHOL COMPOUNDS

James M. Straley and David J. Wallace, Kingsport, Tenn., assignors to Eastman Kodak Company, Rochester, N.Y.
No Drawing. Application Feb. 2, 1968, Ser. No. 707,438, now Patent No. 3,515,506, dated June 2, 1970, which is a continuation-in-part of application Ser. No. 394,063, Sept. 2, 1964. Divided and this application Mar. 23, 1970, Ser. No. 22,062

Int. Cl. C09b 29/20

U.S. Cl. 260—204                                         7 Claims

ABSTRACT OF THE DISCLOSURE

Compounds having the formula

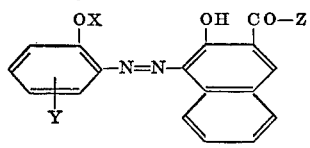

wherein X is alkyl; Y is hydrogen, halogen, alkyl, alkoxy, or trifluoromethyl; and Z is alkoxy, amino, alkylamino, morpholino, piperidino or cyclohexylamino, are useful for dyeing polypropylene containing nickel or cobalt.

---

This application is a divisional of our U.S. application Ser. No. 707,438, filed Feb. 2, 1968 now U.S. Pat. 3,515,-506, for "Polypropylene Dyed With Metal Complexes of Azo Compounds" which is a continuation-in-part of our U.S. application Ser. No. 394,063, filed Sept. 2, 1964, for "Metallized Azo Compounds," now abandoned.

This invention relates to polypropylene textile materials, containing a nickel or cobalt compound, dyed with certain monoazo dyes and, more particularly, to polypropylene fibers containing a complex metal compound of one atom of nickel or cobalt in combination with two moles of certain azo compounds.

The monoazo compounds useful in preparing the dyed polypropylene materials have the general formula

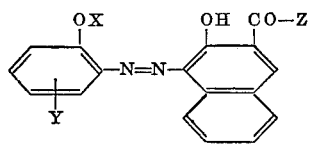

wherein X represents lower alkyl, e.g. methyl, ethyl; Y represents hydrogen; halogen, e.g. chlorine, bromine; lower alkyl; lower alkoxy, e.g. methoxy, ethoxy, butoxy, and lower haloalkyl, e.g. trifluoromethyl, β-chloroethyl and γ-bromobutyl. Z represents lower alkoxy, amino, lower alkylamino, e.g. methylamino, butylamino; morpholino, piperidino, or cyclohexylamino.

Herein lower alkyl group, lower alkoxy group etc., means that from 1 to 5 carbon atoms are present in the carbon chain of the group.

The azo compounds described above are particularly useful for dyeing polypropylene textile fibers, yarns and fabrics which contain minor amounts of a salt of nickel or cobalt. The azo compounds do not contain in their molecules, groups such as sulfo, carboxyl, alkylsulfonyl or sulfonamido groups since azo compounds containing such groups do not form suitable metal complexes for coloring the polypropylene fibers. The compound having the formula

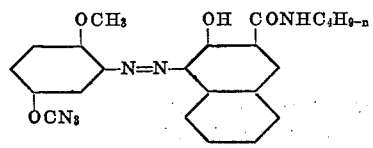

has excellent affinity for nickel- or cobalt-containing polypropylene fibers; however, if the 5-methoxy group is replaced e.g. by —SO₃H, —SO₂CH₃ or —SO₂NH₂, the azo compounds do not form suitable metal complexes for coloring polypropylene.

In general, the dyed polypropylene textile materials possess good fastness properties, for example to light, washing, gas (atmospheric fumes) and sublimation. However, the non-metallized dyes having the above formula have little affinity for non-metallized polypropylene.

Examples of the nickel and cobalt compounds which can be present in the dyed polypropylene materials are nickel chloride, nickel bromide, nickel sulfate, nickel acetate, nickel cyanide, nickel formate, nickle thiocyanate [Ni(SCN)₂], cobaltous bromide, cobaltous chloride, cobaltous acetate, cobaltous cyanide, cobalt thiocyanate, nickel butyrate, nickel pelargonate, nickel benzoate, nickel tartrate, nickel oxalate, nickel adipate, cobalt tartrate, cobalt 2-ethylhexanoate, nickel stearate, nickel phosphate, and the nickel chelate of bis(p-tetramethylbutylphenol) sulfide. The amount of the nickel or cobalt compound present in the dyed polypropylene material will vary depending upon the particular compound employed. Generally, good results are obtained when the polypropylene materials contain from about 0.02 percent to about 1.0 percent, based on the weight of the polypropylene, of nickel or cobalt.

The nickel and cobalt compounds can be incorporated into the polypropylene by well-known techniques such as blending in a Banbury mixer or on the rolls of a rubber mill. The nickel and cobalt compounds should be finely divided by conventional means such as by ball milling prior to incorporation in the polypropylene.

The polypropylene useful in preparing the dyed fibers of the invention is a well-known highly crystalline polypropylene which can be melt spun and drafted to provide fibers having good mechanical properties. Such fibers find extensive use in the manufacture of carpets. The polypropylene described in Coover and Joyner Canadian Pat. 730,226, granted Mar. 15, 1966 is one example of the polypropylene which can be modified with the nickel and cobalt compounds described herein and dyed with the disclosed azo compounds. The polypropylene useful in preparing the dyed fibers can contain, in addition to the metalazo dye complexes, other additives such as stabilizers, pigments, optical brighteners, etc.

When applied to nickel-containing or cobalt-containing polypropylene fibers by conventional techniques, the disclosed azo compounds give dyeings having improved fastness properties, particularly fastness to light. The light fastness of such dyeings are substantially greater than the light fastness of dyeings obtained by using an azo compound in which the alkoxy group, in the position ortho to the azo bridge, of the compounds described herein is replaced with a hydroxy group. The metalazo compound complex which the disclosed azo compounds form with nickel or cobalt under ordinary dyeing conditions exhibit superior stability to light. The complexes of azo compounds having a hydroxy group on the diazo component ortho to the azo bridge do not form such stable complexes and therefore exhibit marked fading upon exposure to light.

Dyed polypropylene fibers having superior color fastness are obtained by applying to polypropylene, containing a nickel compound, an azo compound having the formula

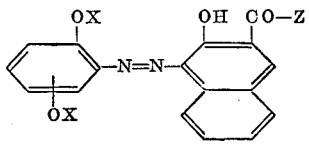

wherein X represents lower alkyl and Z represents lower alkylamino.

The azo compounds can be applied to the metal-containing polypropylene fibers according to well-known procedures by dispersing the azo compound in water by means of a dispersing agent. Dyeing of the metal-modified polypropylene fibers can be carried out at the boil.

The following examples further illustrate the preparation of the azo compounds and the application of the compounds to metal-modified polypropylene fibers.

EXAMPLE 1

Preparation of the amides and esters 94 g. of 3-hydroxy-2-napthoic acid is slurried in 500 cc. of dry benzene containing 3 cc. of dry dimethylformamide. There is added with stirring 61.0 g. thionyl chloride in about 1 hr. After holding 1 hr. longer at room temperature, it is heated at 55–60° C. under such vacuum that the $SO_2$, HCl and excess thionyl chloride are removed. Dry air is then swept through the mix to remove the last traces of these materials and the mix finally brought to room temperature. There is then added dropwise below 60° C., 88 g. of n-butylamine. The mix is then held 1.5 hrs. at 75° C. and the benzene distilled off in vacuo. The residue is poured into 2,000 cc. of water containing 200 cc. of alcohol and stirred 30 min. The product is filtered off, washed with water and air-dried. The yield is 68–70 g., M.P. 117–119° C. Recrystallization from benzene raises the M.P. to 119–120° C. Other amides are made in the same fashion replacing the butylamine with the desired amine. The unsubstituted 3-hydroxy-2-napthhamide is prepared according to Ber. 58, 2845. The alkyl esters of 3-hydroxy-2-naphthoic acid are prepared by the process of Z. phsik. Chem., 94, 405, or by treating the acid chloride prepared as above with the appropriate alcohol instead of an amine.

EXAMPLE 2

Preparation of the dye 1.53 g. of 2,5-dimethoxyaniline, 10 cc. of water and 3 cc. conc. HCl are brought to 80° C., filtered, and the filtrate cooled to 0° C. 0.72 g. of $NaNO_2$ in 2 cc. of water is added at near 0° C. and the mix held 1 hr. longer at this temperature. The excess $HNO_2$ is destroyed by addition of sulfamic acid. The diazo solution thus prepared is added to a stirred solution of 2.43 g. of the product of Example 1 in 25 cc. of water containing 1.5 g. NaOH and 10 cc. alcohol with enough crushed ice to bring the temperature to 5° C. The mix is stirred 2 hrs. longer without further cooling and diluted to 400 cc. with water. The dye is filtered off, washed with water and air-dried. The yield is 3.5 g., M.P. 161–4° C. The compound has the formula

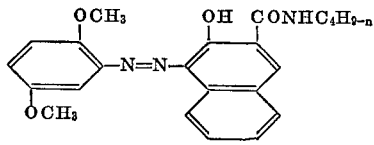

EXAMPLE 3

Dyeing polypropylene fabric 50 mg. of the dye of Example 2 is dissolved in 10 cc. of 2-methoxyethanol and 3 cc. of a 3% sodium-N-methyl-N-oleyl taurate and 3% sodium lignin sulfonate aqueous solution is added. The bath is made up to a volume of 200 cc. with warm water and the pH brought to about 4 with acetic acid. 5 g. of a knitted fabric of polypropylene fibers containing about 2% nickel chelate of bis(p-t-octylphenol) sulfide is entered and dyed at the boil for one hour. The dyed fabric is rinsed and scoured for 20 minutes in 300 cc. of water containing 2 g. soap and 2 g. soda ash at 120° F., then dried. The fabric is dyed a deep bluish-red shade of excellent resistance to the action of light, laundering and dry-cleaning in perchloroethylene.

In the manner of the above examples, azo compound having the formula

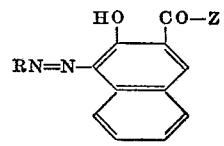

are prepared and applied to nickel-containing polypropylene fibers to obtain dyeings having excellent fastness properties.

| R | Z | Color of dyed fiber |
|---|---|---|
| 2-methoxyphenyl | —NH isopropyl | Red. |
| Do | —NH₂ | Red. |
| Do | —O—ethyl | Red. |
| Do | —N(CH₂—CH₂)₂O | Red. |
| 2-ethoxyphenyl | —NHCH₃ | Red. |
| 2,5-dimethoxyphenyl | —NH isopropyl | Blue-red. |
| Do | —O-isobutyl | Do. |
| Do | —N-isoamyl | Do. |
| Do | —NHCH₂CH₂CH₃ | Do. |
| Do | —NHCH₃ | Do. |
| 2,5-dibutoxyphenyl | —NHCH₂CH₃ | Do. |
| 2,5-dimethoxy-4-t-butyl-phenyl | —NHCH₂CH₂CH₂CH₃ | Red-violet. |
| Do | —O amyl | Do. |
| Do | —NHCH₂CH₂OCOCH₃ | Do. |
| 2-methoxy-5-methylphenyl | —NH₂CH₂CH(CN)CH₃ | Red. |
| Do | —N(CH₂—CH₂)₂CH₂ | Red. |
| 2-methoxy-5-chlorophenyl | —NHC₄H₉ | Red. |
| 2-methoxy-5-trifluoromethyl-phenyl | —NHC₄H₉ | Red. |
| 2,5-dimethoxyphenyl | —NH-cyclohexyl | Red. |

The invention has been described in considerable detail with particular reference to certain preferred embodiments thereof, but it will be understood that variations and modifications can be effected within the spirit and scope of the invention as described hereinabove, and as defined in the appended claims.

We claim:

1. A compound having the formula

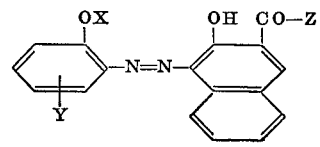

wherein
X represents lower alkyl;
Y represents hydrogen or lower alkoxy; and
Z represents lower alkoxy, amino, lower alkylamino, or cyclohexylamino.

2. A compound according to claim 1 wherein
Y represents lower alkoxy; and
Z represents lower alkylamino.

3. A compound according to claim 1 having the formula

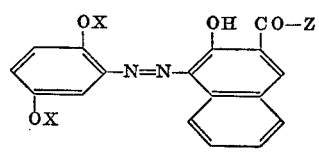

wherein
X represents lower alkyl; and
Z represents lower alkylamino.

4. A compound according to claim 1 having the formula

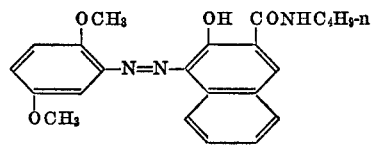

5. A compound according to claim 1 having the formula

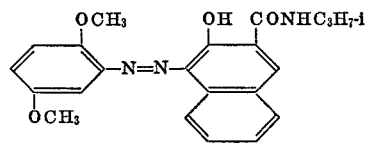

6. A compound according to claim 1 having the formula

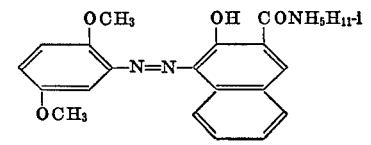

7. A compound according to claim 1 having the formula

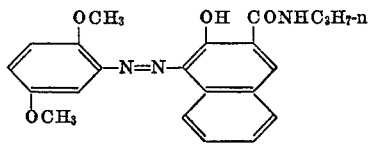

References Cited
UNITED STATES PATENTS

| | | | |
|---|---|---|---|
| 3,079,375 | 2/1963 | Straley et al. | 260—151 X |
| 3,202,511 | 8/1965 | Mory et al. | 260—151 X |
| 2,888,452 | 5/1959 | Schmid et al. | 260—202 X |
| 3,135,730 | 6/1964 | Heyna et al. | 260—198 X |

FOREIGN PATENTS

| | | | |
|---|---|---|---|
| 642,346 | 1/1964 | Belgium | 260—204 |

LEWIS GOTTS, Primary Examiner

C. F. WARREN, Assistant Examiner

U.S. Cl. X.R.

260—152, 202; 8—41 R